Figures 1, 2, 3:
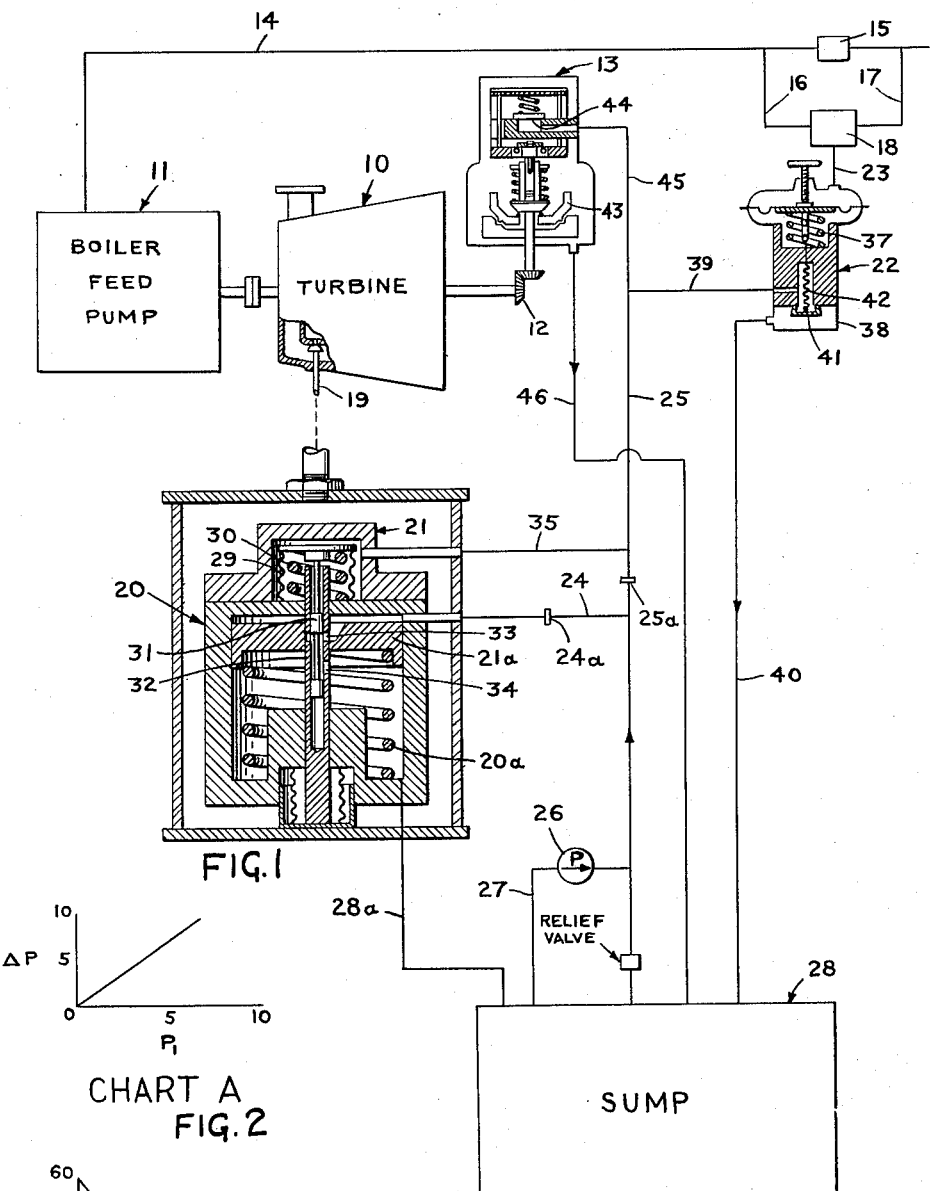

Nov. 29, 1960    J. G. WILLIAMS ET AL    2,961,964
CONTROL SYSTEM FOR A BOILER FEED PUMP DRIVEN BY A TURBINE
Filed Jan. 26, 1956

CHART A

CHART B

JOHN G. WILLIAMS
AARNE A. LUOMA
INVENTORS

BY Daniel A. Bolis
ATTY

United States Patent Office 2,961,964
Patented Nov. 29, 1960

2,961,964

CONTROL SYSTEM FOR A BOILER FEED PUMP DRIVEN BY A TURBINE

John G. Williams, Springfield, N.J., and Aarne A. Luoma, Wellsville, N.Y., assignors to Worthington Corporation, Harrison, N.J., a corporation of Delaware Filed Jan. 26, 1956, Ser. No. 561,552

2 Claims. (Cl. 103—20)

The present invention relates to a boiler feed system and more particularly to control means for governing the speed of a turbine driven boiler feed pump.

The present invention provides a controller for regulating the speed of a turbine driven boiler feed pump in response to a pneumatic signal pressure that can be made proportional to any other desired variable such as constant pressure or flow, or constant level in the boiler.

The present invention further provides a control system for a boiler feed pump having overspeed control means which nullify the signal from the pressure controller whenever the maximum safe relative speed of the pump and turbine is reached to limit the speed of the pump and turbine to prevent overspeeding thereof.

In accordance with the present invention a pneumatic hydraulic pressure control device is provided which receives a pneumatic signal from a variable, such as constant pressure, level or flow, and modulates the pressure in the pilot oil line of the pilot valve which operates a servo motor operatively connected to the steam governor valve of the turbine for regulating the steam flow therethrough to control the speed of the turbine and the boiler feed pump driven thereby. The oil line of the pilot valve communicates with an overspeed governor driven by the turbine and having a valve therein adapted to open to modulate the oil pressure in the pilot valve oil line to cut off the supply of steam flowing to the turbine to nullify the signal from the pressure controlled device when the turbine is operating at a speed above the maximum safe rotative speed of the pump and turbine.

The invention will be better understood from the following description when considered in connection with the accompanying diagrammatic drawing forming a part thereof and illustrating the control system for the turbine driven boiler feed pump of the present invention.

Referring to the drawing, the reference numeral 10 designates a turbine connected to drive a feedwater pump 11. Turbine 10 is connected through gear means 12 to an overspeed governor 13 to drive the overspeed governor at a speed proportional to the turbine shaft speed. A discharge line 14 having a feedwater regulating valve 15, of any well known type which may be of the order of the valve shown in United States Patent No. 2,499,169, disposed therein is connected to pump 11 and communicates with a steam boiler, not shown. Lines 16 and 17 communicate with the upstream and downstream sides respectively of valve 15 and with a differential pressure transmitter 18 which may be of the type shown in United States Patent 2,808,725, which in combination with other well known pneumatic devices, not forming part of the present invention, will transmit an air pressure signal directly proportional to the difference of pressure across valve 15.

The turbine is provided with a steam governor valve 19 actuated by a servo motor 20 for controlling the flow of steam therethrough. The operation of the servo motor 20 is controlled by a relay or pilot valve 21, in turn, controlled by a pneumatic hydraulic pressure controller device 22 which receives a pneumatic signal from a differential pressure transmitter 18 through an air line 23 in communication therewith.

Servo motor 20 is a conventional spring loaded diaphragm or piston type motor provided with a piston 21a normally urged upwardly in the motor housing by a compression spring 20a disposed on the underside thereof. Oil under pressure is supplied to the upper side of piston 21a through a line 24 having an orifice 24a therein. Line 24 communicates with the discharge line 25 of an oil pump 26 having a suction line 27 in communication with storage tank or sump 28. The portion of the servo motor housing below piston 21a communicates with tank 28 through a drain line 28a.

Pilot valve 21 comprises a housing having a conventional sylphon bellows 29 therein normally urged upwardly by a spring 30 disposed within the bellows. Bellows 29 is provided with a plunger valve 31 fixed thereto for movement therewith. The lower end of valve 31 is slidably disposed in a hollow rod 32 extending axially through servo motor piston 21a and forming a valve housing therein. Rod 32 is provided with an inlet opening 33 in communication with the portion of the servo motor housing above piston 21 and an outlet opening 34 in communication with the portion of the servo motor housing below the diaphragm. Oil under pressure is supplied to the outside of bellows 29 by pilot oil entering the pilot valve housing through line 35 in communication with line 25 beyond line 24. An orifice 25a is disposed in line 25 beyond line 24 for reducing the pressure of the fluid passed to the pilot valve.

Pneumatic hydraulic controller 22 comprises a housing having a spring loaded piston 37 disposed in the upper portion thereof adapted to oppose a force transmitted to the upper side of the diaphragm through air line 23 in communication therewith. The lower portion of the housing is provided with a fluid chamber 38 therein having an inlet line 39 in communication with line 25 to receive oil therefrom and an outlet or drain line 40 in communication with sump 28 for discharging oil thereto. A valve 41 is disposed in the chamber connected to a tension spring 42, in turn connected to piston 37 to control the flow of oil therethrough. When piston 37 is maintained in its uppermost position in the controller, spring 42 is elongated to seat valve 41 and reduce the flow of oil through chamber 38. When the air signal transmitted to the controller from the differential pressure transmitter is greater than the force in the spring maintaining the piston in the uppermost position in the controller, valve 41 opens and a portion of the oil in line 39 flows through the chamber 38 and is discharged through line 40 back to the tank 28.

Overspeed governor 13 is of a conventional type wherein rotatable fly balls 43 actuated by centrifugal force, are disposed in a housing and adapted to raise and open a valve 44 therein held closed by a spring when the speed of a turbine exceeds a predetermined value. Oil lines 25 and 39 communicate with one side of governor valve 44 through inlet line 45 while a drain line 46 is provided on the other side of valve 44 for discharging oil back to tank 28.

In operation, when the feedwater pump 11 is discharging feedwater through discharge line 14 in excess of a desired value, the pressure differential across feedwater control valve 15 acting through lines 16 and 17 on the differential pressure transmitter 18 causes it to increase the air pressure transmitted to the interior of pneumatic hydraulic pressure controller 22 as illustrated in chart A of the drawing, wherein the differential pressure across valve 15 is indicated as $\Delta P$ and the air pressure in line 23 as $P_1$. It will be noted that the air signal pressure $(P_1)$ is directly proportional to the differential pressure. The air pressure on the upper side of spring loaded piston 37 thus increases, so as to move the spring downwardly.

therein to open hydraulic valve 41 and permit oil to flow through the controller and drain back through line 40 to sump tank 28. This decreases the control oil pressure in lines 25, 35, 39, and 45, beyond orifice 25a. The relationship of the air pressure signal ($P_1$) to the control oil pressure ($P_c$) is shown in chart B of the drawing wherein it will be noted that the air pressure ($P_1$) varies inversely as the control oil pressure ($P_c$). Decreasing control oil pressure decreases the oil pressure in pilot valve 21 so that spring 30 therein moves bellows 29 and plunger valve 31 upwardly to permit communication between inlet 33 and outlet 34 in rod 32 of the servo motor to permit the flow of oil from line 24 through the servo motor and back to the sump tank through line 28a. This reduces the pressure of the oil on the upper side of piston 21a of the servo motor so that the servo motor spring 20a moves the piston 21a and steam governor valve 19 operatively connected thereto upwardly to reduce the flow of steam through the turbine. Thus, the speed of the turbine 10 and feedwater pump 11 driven thereby is reduced and the flow of feedwater through line 14 is thereby decreased.

In operation, when the difference of pressure across the feedwater control valve 15 decreases below a desired value, indicating an insufficient flow of feedwater therethrough, the speed of pump 11 must be increased. The decrease in the differential pressure is transmitted through lines 16 and 17 to the differential pressure transmitter 18. Transmitter 18 causes the air pressure signal to controller 22 to decrease so that the spring loaded piston 37 therein moves upwardly to close valve 41 therein and reduce the flow of oil from line 39 through the controller. This increases the oil pressure in lines 25, 35, 39, and 45, beyond orifice 25a and thereby increases the pressure on the upper side of pilot valve bellows 29 so that the bellows and plunger valve 31 move downwardly to cut off the flow of oil from line 24 through the servo motor 20. This increases the oil pressure on the upper side of piston 21a and forces the piston and steam governor valve 19 downwardly to open the governor valve and permit an increase in the flow of steam through the turbine 10. This increases the speed of the turbine and pump 11 so that the flow of feedwater to line 14 is increased. Referring to chart A, it will be noted that since the air signal pressure $P_1$ is inversely proportional to the control oil pressure, a decrease in air signal pressure, or a complete failure of air signal pressure causes the control oil pressure to increase and the speed of the turbine and pump to increase. This insures delivery of feedwater to the boiler and thereby prevents damage thereto by overheating of tubes, etc., therein. Thus, the present invention provides a control system for a feedwater pump wherein an air signal is applied to the pneumatic hydraulic controller device therein to indicate the required speed from the main feed pump in order to maintain a predetermined difference of pressure across the boiler feed control valve. Thus, the pneumatic hydraulic controller is responsive to any air signal pressure and it can be made proportional to any desired variable such as constant pressure, water level, or flow.

In operation, when the controller device receives a signal demanding an increase in the supply of feedwater and opens turbine governor valve 19 and maintains it open until the turbine speed exceeds the safe speed for which it is designed, the overspeed governor control 13 of the present invention operates to nullify the signal from the controller device and close valve 19 to prevent the turbine from running away. This condition may occur where the demand of feedwater for the boiler exceeds the maximum capacity of the pump causing the air signal from the controller device to demand an increase in the turbine and pump speed to increase the flow of feedwater. At this time, the valve 44 in the governor, preset to open only when the turbine speed exceeds the safe speed for which the turbine is designed and above the turbine speed normally demanded by the controller device to deliver sufficient feedwater to the boiler, is raised by the governor balls to allow oil under pressure to drain from lines 45, 39, 25 and 35 through the governor to sump tank 28. This reduces the oil pressure in these lines and in the pilot valve 21 so that the servo motor acts to close turbine valve 19, as hereinbefore described, to prevent the turbine from running away. Thus, the centrifugal governor in the present system acts as a safety device should the air signal to the pneumatic hydraulic controller device act to cause the turbine to run away.

It will be understood that the invention is not to be limited to the specific construction or arrangement of parts shown but that they may be widely modified within the invention defined by the claims.

What is claimed is:

1. A pneumatic-hydraulic pressure control system for a boiler feedwater system including a turbine having a steam admission valve and a governor and said turbine driving a pump to cause same to deliver fluid to a line having a regulating valve means in said line for regulating flow of fluid therethrough, said pneumatic-hydraulic pressure control system including a differential pressure transmitter connected across said regulating valve means to sense variations in pressure across said regulating valve means, a pneumatic-hydraulic pressure controller operatively connected to said differential pressure transmitter to receive signals therefrom when the pressure variations across said valve vary from a predetermined value, a servo-motor operatively connected to the steam admission valve of said turbine, a hydraulic fluid inlet line in communication with said pneumatic-hydraulic pressure controller and said servo-motor for supplying fluid under pressure thereto, a fluid discharge line in communication with said pneumatic-hydraulic pressure controller for discharging fluid therefrom, a valve in said pneumatic-hydraulic pressure controller for controlling the flow of fluid therethrough, and a spring-loaded diaphragm means in said controller and operatively connected to said valve in the pneumatic-hydraulic pressure controller and for controlling the opening and closing of said valve, said diaphragm being responsive to signals from said differential pressure transmitter to close said valve when the pressure across the regulating valve means drops below a predetermined value to cause said servo-motor means to operate said steam admission valve to regulate the speed of said turbine, and to open said valve when the pressure across said regulating valve increases above a predetermined value to cause said servo-motor means to operate said steam admission valve to regulate the speed of said turbine.

2. In the apparatus claimed in claim 1 wherein the governor is further characterized as having an inlet therein in communication with said hydraulic inlet line to receive fluid therefrom and an outlet to discharge fluid therethrough, governor valve means for controlling the flow of fluid therethrough, said governor valve means being set to open to permit fluid to flow therethrough when the turbine speed exceeds a value above the design speed thereof to cause said servo-motor to shut said steam admission valve.

References Cited in the file of this patent

UNITED STATES PATENTS

| | | |
|---|---|---|
| 902,001 | Rateau | Oct. 27, 1908 |
| 1,496,005 | Lee | June 3, 1924 |
| 1,655,683 | Standerwick | Jan. 10, 1928 |
| 1,831,072 | Lee | Nov. 10, 1931 |
| 1,874,136 | Standerwick | Aug. 30, 1932 |
| 1,987,364 | Dahl | Jan. 8, 1935 |
| 2,163,281 | Hillier | June 20, 1939 |
| 2,880,673 | Soderberg | Apr. 7, 1959 |

FOREIGN PATENTS

| | | |
|---|---|---|
| 691,547 | Germany | May 30, 1940 |